United States Patent
Sakai et al.

(10) Patent No.: US 10,189,267 B2
(45) Date of Patent: Jan. 29, 2019

(54) LIQUID EJECTING APPARATUS, LIQUID EJECTING METHOD, AND COMPUTER PROGRAM

(71) Applicant: Seiko Epson Corporation, Tokyo (JP)

(72) Inventors: Hirofumi Sakai, Shiojiri (JP); Shinichi Nakamura, Okaya (JP); Junichi Sano, Chino (JP); Takahiro Katakura, Okaya (JP); Keigo Sugai, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/831,792

(22) Filed: Dec. 5, 2017

(65) Prior Publication Data

US 2018/0178533 A1    Jun. 28, 2018

(30) Foreign Application Priority Data

Dec. 28, 2016 (JP) .................. 2016-254630

(51) Int. Cl.
*B41J 2/18* (2006.01)
*B41J 2/175* (2006.01)
*B41J 2/045* (2006.01)

(52) U.S. Cl.
CPC ....... *B41J 2/17596* (2013.01); *B41J 2/04581* (2013.01); *B41J 2/18* (2013.01)

(58) Field of Classification Search
CPC ........................................................ B41J 2/18
See application file for complete search history.

(56) References Cited

U.S. PATENT DOCUMENTS

| 2014/0118448 A1* | 5/2014 | Domae ............... B41J 2/18 347/89 |
| 2015/0048120 A1 | 2/2015 | Ikushima |
| 2017/0197431 A1* | 7/2017 | Yamada .......... B41J 2/17596 |
| 2018/0170066 A1* | 6/2018 | Ohtsu .............. B41J 2/18 |

FOREIGN PATENT DOCUMENTS

| JP | 4377153 B2 | 12/2009 |
| JP | 2013-192972 A | 9/2013 |
| WO | WO-2013-031531 A1 | 3/2013 |

* cited by examiner

*Primary Examiner* — Julian D Huffman
(74) *Attorney, Agent, or Firm* — Harness, Dickey & Pierce, P.L.C.

(57) ABSTRACT

A liquid ejecting apparatus is provided with a liquid chamber which communicates with a nozzle for ejecting liquid; an inflow path which is connected to the liquid chamber; a liquid supply unit which supplies the liquid to the inflow path; an outflow path which is connected to the liquid chamber, and through which the liquid is caused to flow out from the liquid chamber; a moving object which causes the liquid to be ejected from the nozzle by reciprocating toward the nozzle in the liquid chamber; and an actuator which causes the moving object to reciprocate. In an ejecting state in which liquid is continuously ejected from the nozzle due to at least reciprocating of the moving object, a flow path resistance of the outflow path is larger than that of the inflow path.

7 Claims, 5 Drawing Sheets

LIQUID EJECTING APPARATUS, LIQUID EJECTING METHOD, AND COMPUTER PROGRAM

BACKGROUND

1. Technical Field

The present invention relates to a liquid ejecting apparatus.

2. Related Art

In the related art, in a liquid ejecting apparatus in JP-A-2013-192972, for example, in order to prevent solid particles in liquid from sinking in the vicinity of a nozzle, an inflow path and an outflow path are connected to a liquid chamber which communicates with the nozzle, and liquid is constantly supplied to the liquid chamber through the inflow path and the outflow path by being circulated.

In the liquid ejecting apparatus in JP-A-2013-192972, the nozzle is closed when a rod provided in the liquid chamber descends, and the nozzle is opened when the rod ascends, and liquid is ejected. However, in JP-A-2013-192972, for example, a situation in which liquid is ejected in a short cycle is not taken into consideration. For this reason, in a liquid ejecting apparatus in which an inflow path and an outflow path are connected to a liquid chamber, a technology in which it is possible to eject liquid in a short cycle is desired.

SUMMARY

An advantage of some aspects of the invention is to execute the following embodiments.

(1) According to an aspect of the invention, there is provided a liquid ejecting apparatus which includes a liquid chamber which communicates with a nozzle for ejecting liquid; an inflow path which is connected to the liquid chamber; a liquid supply unit which supplies the liquid to the inflow path; an outflow path which is connected to the liquid chamber, and through which the liquid is caused to flow out from the liquid chamber; a moving object which causes the liquid to be ejected from the nozzle by reciprocating toward the nozzle in the liquid chamber; and an actuator which causes the moving object to reciprocate, in which, at least in an ejecting state in which the liquid is continuously ejected from the nozzle due to reciprocating of the moving object, a flow path resistance of the outflow path is larger than that of the inflow path. In this configuration, since the flow path resistance of the outflow path is larger than that of the inflow path, in a state in which liquid is continuously ejected from the nozzle due to at least reciprocating of the moving object, it is possible to rapidly replenish the nozzle with liquid. As a result, it is possible to eject liquid in a short cycle.

(2) The liquid ejecting apparatus may further include a changing mechanism which can change a flow path resistance of at least one of the inflow path and the outflow path, and may further include a control unit which sets the flow path resistance of the outflow path in the ejecting state to be larger than that of the inflow path, by controlling the changing mechanism. In this configuration, it is possible to dynamically change the flow path resistance of at least one of the inflow path and the outflow path.

(3) In the liquid ejecting apparatus, the control unit may set the flow path resistance of the outflow path in a standby state in which the moving object stands by in a state in which the nozzle is closed to be smaller than that of the outflow path in the ejecting state, by controlling the changing mechanism. In this configuration, liquid easily flows to the outflow path from the liquid chamber in the standby state in which liquid is not ejected. For this reason, it is possible to suppress sinking or accumulating of a sinking component in liquid in vicinity of a nozzle.

(4) In the liquid ejecting apparatus, the changing mechanism may change the flow path resistance by changing at least a part of flow path sectional area of at least one of the inflow path and the outflow path. In this configuration, it is possible to easily change the flow path resistance.

(5) The liquid ejecting apparatus may further include a circulation path through which the liquid which flows out to the outflow path is resupplied to the liquid supply unit. In this configuration, it is possible to efficiently use liquid.

The invention can be executed in various forms, in addition to the form as the liquid ejecting apparatus. For example, it is possible to execute the invention in a method of controlling a liquid ejecting apparatus, a computer program for controlling the liquid ejecting apparatus, and a form of a tangible recording medium, or the like, which is not primary, in which the computer program is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
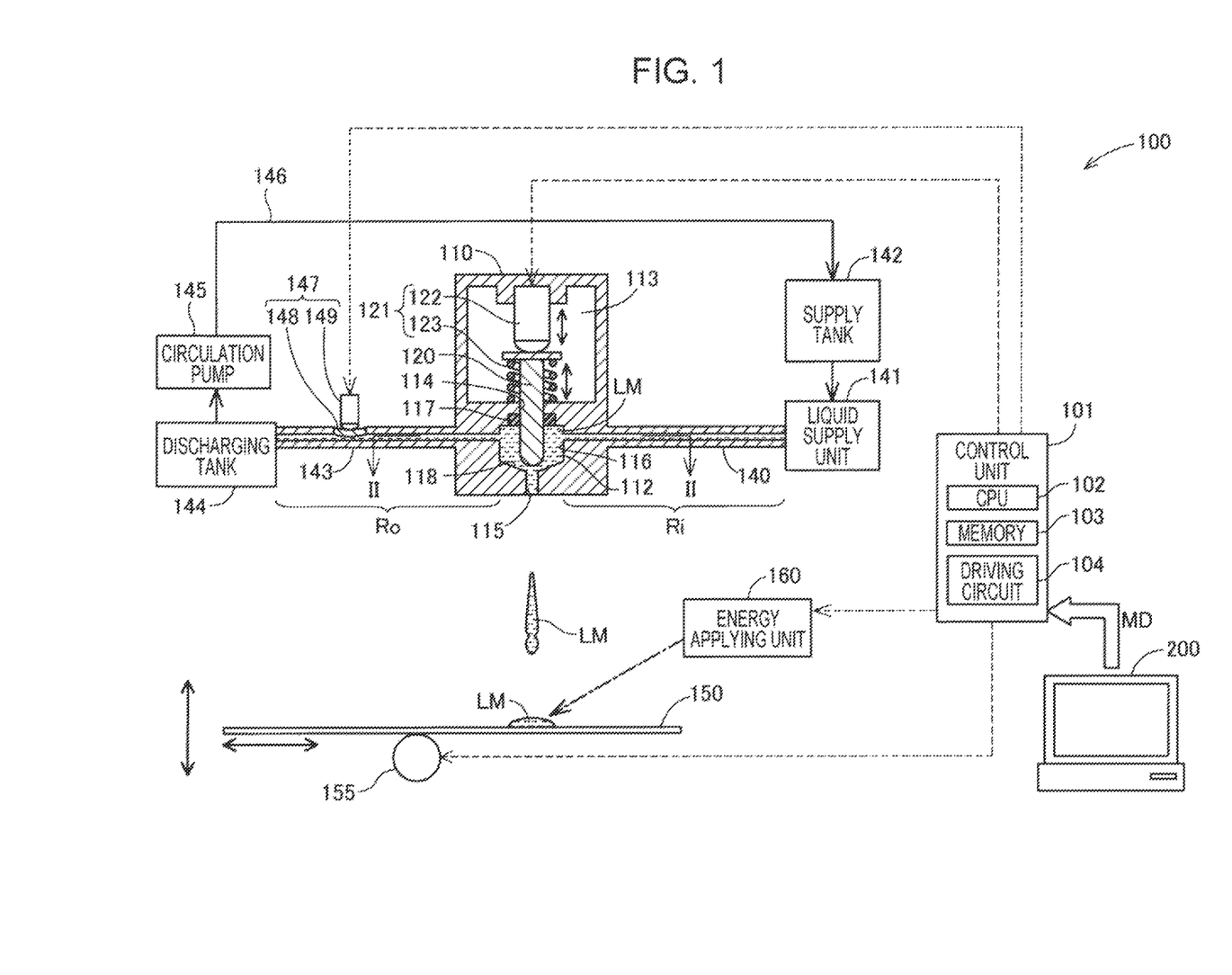
FIG. 1 is an explanatory diagram which illustrates a schematic configuration of a liquid ejecting apparatus according to a first embodiment.
Figure 2:
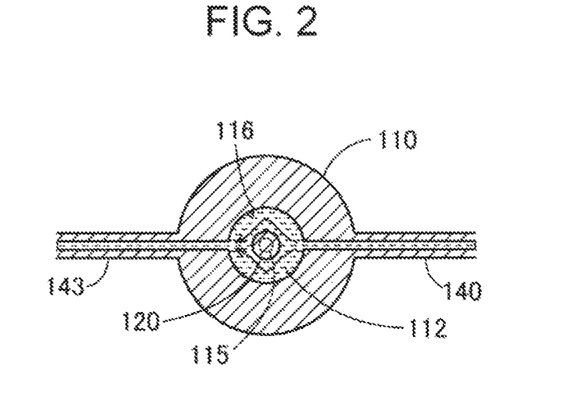
FIG. 2 is a sectional view taken along line II-II in FIG. 1.

FIG. 1 is an explanatory diagram which illustrates a schematic configuration of a liquid ejecting apparatus 100 according to a first embodiment of the invention. FIG. 2 is a sectional view taken along line II-II in FIG. 1. The liquid ejecting apparatus 100 according to the embodiment is a dispenser which can eject liquid LM. The liquid ejecting apparatus 100 in the embodiment forms a planar sectional body by ejecting the liquid LM as a base material toward a shaping stage 150, and can manufacture a three-dimensional object by stacking a plurality of the sectional bodies. That is, the liquid ejecting apparatus 100 can function as a three-dimensional shaping device. In the following descriptions, "low" denotes a gravity direction, and "high" denotes a direction opposite to the gravity direction.

The liquid LM which is used in the embodiment is, for example, a fluidity composition including a powder material and a solvent. The powder material is, for example, elementary powder of magnesium (Mg), iron (Fe), cobalt (Co), chrome (Cr), aluminum (Al), titanium (Ti), copper (Cu), and nickel (Ni), or alloy powder containing one or more of the metal (maraging steel, stainless steel, cobalt chrome molybdenum, titanium alloy, nickel alloy, aluminum alloy, cobalt alloy, cobalt chrome alloy), or may be mixed powder in which one, or two or more types selected from the elementary powder or alloy powder are combined. In addition to that, the powder material may be an inorganic pigment of titanium oxide, or the like, or a pearl pigment. The solvent may be, for example, water; (poly) alkylene glycol monoalkyl ethers such as ethylene glycol monomethyl ether, ethylene glycol monoethyl ether, propylene glycol monomethyl ether, or propylene glycol monoethyl ether; acetate esters such as ethyl acetate, n-propyl acetate, iso-propyl acetate, n-butyl acetate, or iso-butyl acetate; aromatic hydrocarbons such as benzene, toluene, or xylene; ketones such as methyl ethyl ketone, acetone, methyl isobutyl ketone, ethyl-n-butyl ketone, diisopropyl ketone, or acetyl acetone; alcohols such as ethanol, propanol, or butanol; tetraalkyl ammonium acetates; sulfoxide-based solvent such as dimethyl sulfoxide, or diethyl sulfoxide; pyridine-based solvent such as pyridine, γ-picoline, or 2, 6 lutidine; ionic liquid such as tetraalkyl ammonium acetate (for example, tetrabutyl ammonium acetate, or the like), or a combination of one, or two or more types which are selected from these.

The liquid LM may be a mixed material which is formed in a slurry shape or a paste shape by mixing a binder into the above described powder material and a solvent. The binder may be, for example, an acrylic resin, an epoxy resin, a silicone resin, a cellulose resin, or a synthetic resin other than those, or polylactic acid (PLA), polyamide (PA), polyphenylene sulfide (PPS), or a thermoplastic resin other than those. The liquid LM is not limited to liquid containing the above described powder material, and, for example, may be liquid formed by melting a resin of general engineering plastic of polyamide, polyacetal, polycarbonate, denaturated-polyphenylene ether, or polybutylene terephthalate, or the like. The liquid LM may be a resin of engineering plastic of polysulphone, polyethersulfone, polyphenylene sulfide, polyarylate, polyimide, polyamide imide, polyether imide, polyether ether ketone, in addition to those. In this manner, a constituent material of the liquid LM is not limited, and it is possible to adopt metal other than the above described metal, ceramics, a resin, or the like. In addition, a sintering additive may be contained in the liquid LM. A viscosity range of the liquid LM is, for example, from 100 mPa·s to 20000 mPa·s.

The shaping stage 150 can be moved, using a movement mechanism 155. The movement mechanism 155 is provided with a motor, a roller, a shaft, various actuators, and the like, for moving the shaping stage 150. The shaping stage 150 moves in the horizontal direction or the vertical direction relatively to an ejecting unit 110 from which the liquid LM is ejected, using the movement mechanism 155. A movement of the shaping stage 150 using the movement mechanism 155 is controlled by a control unit 101. In addition, in another embodiment, it may be a configuration in which the shaping stage 150 is fixed, and the ejecting unit 110 moves with respect to the shaping stage 150.

An energy applying unit 160 hardens the liquid LM ejected onto the shaping stage 150 by applying energy. According to the embodiment, the energy applying unit 160 is configured of a laser device, and applies light energy to liquid LM by radiating laser. The energy applying unit 160 includes at least a laser light source, a condensing lens for condensing laser which is output from the laser light source toward the liquid LM, and a galvanometer mirror for scanning laser (not illustrated). The energy applying unit 160 scans a position of the liquid LM in the shaping stage 150 using laser, and sinters powder material in the liquid LM using light energy of laser. Alternatively, the powder material in the liquid LM is solidified, after being firstly melted. In addition, the energy applying unit 160 is not limited to the laser device, and may be configured using another device such as a UV irradiating device, according to characteristics of the liquid LM.

As described above the above described liquid ejecting apparatus 100 in the embodiment is provided with a shaping stage 150, the movement mechanism 155, and the energy applying unit 160. However, in another embodiment, the shaping stage 150 or the movement mechanism 155 may be omitted, according to a form of a shaped object. In addition, the energy applying unit 160 may be omitted according to a type of the liquid LM.

The liquid ejecting apparatus 100 according to the embodiment is provided with the ejecting unit 110, an inflow path 140, a liquid supply unit 141, and an outflow path 143. The ejecting unit 110 is provided with a liquid chamber 112 which communicates with a nozzle 115, a moving object 120, and an actuator 121. In addition, the liquid ejecting apparatus 100 according to the embodiment is provided with a changing mechanism 147, the control unit 101, and a circulation path 146. As the liquid supply unit 141, it is possible to adopt various devices which can supply liquid LM in a pressure feeding manner, and for example, it is possible to use a pump such as a gear pump or a vane pump.

The control unit 101 controls operations of the entire liquid ejecting apparatus 100. The control unit 101 is configured as a computer for controlling which includes a CPU 102 and a memory 103, and is further provided with a driving circuit 104. The CPU 102 executes flow path resistance changing processing which will be described later based on a computer program stored in the memory 103. The computer program may be recorded in various recording mediums such as a hard disk, a flash memory, or a DVD-ROM, for example. The driving circuit 104 includes a waveform generator or a power amplifier for driving the actuator 121 or a changing mechanism 147 which will be described later.

A computer 200 is connected to the control unit 101. The control unit 101 receives data MD for manufacturing a three-dimensional object from the computer 200. Data denoting an ejecting position of the liquid LM in each layer which is stacked in a height direction of the three-dimensional object is included in the data MD. The control unit 101 may directly obtain the data MD through a network, or a recording medium, not from the computer 200.

The ejecting unit 110 ejects the liquid LM under a control of the control unit 101. The ejecting unit 110 is an approximately cylindrical metallic hollow container, and the inside thereof is partitioned into the liquid chamber 112 and a driving chamber 113. The driving chamber 113 is located above the liquid chamber 112.

The liquid chamber 112 communicates with the nozzle 115 for ejecting liquid LM. As illustrated in FIG. 2, the liquid chamber 112 includes an approximately cylindrical inner side wall 116. According to the embodiment, the nozzle 115 penetrates a base wall of the liquid chamber 112 in the gravity direction, and is formed as a through-hole which is opened in a vertically lower space of the ejecting unit 110. An opening diameter of the nozzle 115 is, for example, 5 μm to 100 μm. An inner wall 118 which is inclined downward from the inner side wall 116 toward the nozzle 115 is provided at the periphery of the nozzle 115 in the liquid chamber 112.

The moving object 120 is provided in the ejecting unit 110 over the liquid chamber 112 and the driving chamber 113. The moving object 120 causes liquid to be ejected from the nozzle 115 by reciprocating toward the nozzle 115 in the inside of the liquid chamber 112. The moving object 120 is an approximately columnar metallic member, and of which a tip end portion located inside the liquid chamber 112 is formed in an approximately hemispherical shape. The moving object 120 causes liquid LM in the nozzle 115 to be ejected to an external space, when the hemispherical tip end portion comes into contact (collide) with the inner wall 118 at the periphery of the nozzle 115. In addition, in a case in which the nozzle 115 is a nozzle of which a diameter becomes gradually or continuously large toward the liquid chamber 112, it may be configured so that the tip end portion of the moving object 120 comes into contact with a wall (including level difference) in the inside of the nozzle, and liquid LM is caused to be ejected to an external space. The moving object 120 passes through the through-hole 114 through which the liquid chamber 112 and the driving chamber 113 communicate. A toric sealing member 117 for suppressing leaking of liquid LM from the liquid chamber 112 to the driving chamber 113 is disposed at the periphery of a through-hole 114 on the liquid chamber 112 side. In addition, the moving object also can be referred to as a "rod", or a "piston".

The actuator 121 for causing the moving object 120 to reciprocate is accommodated in the driving chamber 113. According to the embodiment, the actuator 121 is configured of a piezoelectric element 122 and an urging member 123.

The piezoelectric element 122 has a configuration in which a plurality of piezoelectric elements are stacked, and a length thereof in a stacking direction is changed when a voltage is applied to each piezoelectric material using the control unit 101. A higher end portion of the piezoelectric element 122 is fixed to a high wall face of the driving chamber 113, and a lower end portion is in contact with a higher end portion of the moving object 120. In a state in which the piezoelectric element 122 becomes longest by being extended, a tip end portion of the moving object 120 comes into line contact with the inner wall 118 at the periphery of the nozzle 115 tightly, and closes the nozzle 115.

The urging member 123 is configured of a coiled spring, for example, and urges the moving object 120 upward. When the piezoelectric element 122 contracts, the moving object 120 moves upward following the lower end portion of the piezoelectric element 122 due to an urging force of the urging member 123. According to the embodiment, a distance in which the moving object 120 reciprocates, that is, a stretching length of the piezoelectric element 122 is, for example, 50 µm to 100 µm.

An ejecting operation of liquid LM in the ejecting unit 110 will be described. When the liquid ejecting apparatus 100 is operated, that is, in a state in which a power supply is turned on, the piezoelectric element 122 is usually set to a state of being extended so as to be a longest length so that liquid LM does not flow out from the nozzle 115, and the state in which the nozzle 115 is closed due to the tip end portion of the moving object 120 is maintained. When it is a timing in which ejecting of liquid LM is started, the moving object 120 moves upward due to a temporary contraction state of the piezoelectric element 122, and the nozzle 115 is opened. In this manner, in the liquid chamber 112, the nozzle 115 is filled with liquid LM due to a pressure applied by the liquid supply unit 141.

Thereafter, after a predetermined short time, the piezoelectric element 122 returns to the extended state again, the moving object 120 moves downward, liquid LM in the liquid chamber 112 is ejected from the nozzle 115 by being pressed due to the moving object 120, the tip end portion of the moving object 120 comes into contact with the inner wall 118 of the nozzle 115, and the nozzle 115 is closed. When the moving object 120 moves upward again, after the liquid LM is ejected from the nozzle 115, air enters the vicinity of a rear end of the nozzle 115 from the tip end of the nozzle 115. For this reason, a flow path resistance in the nozzle 115 approximately becomes zero, the liquid LM easily flows to the nozzle 115 rather than the outflow path 143, and the nozzle 115 is rapidly replenished with liquid LM.

In this manner, in the ejecting unit 110 according to the embodiment, liquid LM is ejected from the nozzle 115 as droplets due to a piston movement of the moving object 120 associated with stretching of the piezoelectric element 122. In addition, hereinafter, a state in which the moving object 120 reciprocates in the middle of the operation of the liquid ejecting apparatus 100, more specifically, a state in which liquid LM is continuously ejected due to reciprocating of the moving object 120 is referred to as an "ejecting state". The "reciprocating" includes a state in which the moving object 120 moves downward, a state in which the moving object 120 moves upward, and a state in which the moving object 120 temporarily stops between switching of a movement from the lower side to the higher side and from the higher side to the lower side. The "continuous ejecting" means a state in which liquid LM of a plurality of liquid droplets are ejected one after another in a case in which the liquid LM is ejected as liquid droplets. In addition, a case in which liquid LM is ejected in a connected state is a state in which liquid LM is ejected without an interval. According to the embodiment, liquid LM is ejected from the nozzle 115 as droplets. Meanwhile, in the middle of the operation of the liquid ejecting apparatus 100, a state in which the moving object 120 stands by in a state in which the nozzle 115 is closed, more specifically, a state in which the moving object 120 comes into contact with the inner wall 118 at the periphery of the nozzle 115, and causes ejecting of liquid LM to be stopped is referred to as a "standby state".

The inflow path 140 and the outflow path 143 are connected to the liquid chamber 112. The inflow path 140 is a tube-shaped flow path for supplying liquid LM to the liquid chamber 112. The liquid supply unit 141 which sends liquid supplied from a supply tank 142 into the inflow path 140 in a pressing manner is connected to the upstream side of the inflow path 140. The outflow path 143 is a tube-shaped flow path through which liquid flows out from the liquid chamber 112. A discharging tank 144 is disposed on the downstream side of the outflow path 143. The liquid which flows out from the liquid chamber 112 to the outflow path 143 is temporarily stored in the discharging tank 144. According to the embodiment, in a state in which the liquid ejecting apparatus 100 is operated, liquid LM is usually supplied to the inside of the liquid chamber 112 from the inflow path 140, and liquid LM usually flows out from the outflow path 143, whether the operation state is the ejecting state or the standby state.

The liquid ejecting apparatus 100 according to the embodiment is provided with a circulation path 146 for resupplying liquid which flows out to the outflow path 143 to the liquid supply unit 141. The liquid LM stored in the discharging tank 144 is suctioned by a circulation pump 145, is returned to a supply tank 142 through the circulation path 146, and is supplied to the liquid supply unit 141 again. In addition, in another embodiment, for example, the circulation path 146 and the circulation pump 145 may be omitted, and liquid LM may not be circulated. In addition, it may be set to a configuration in which, for example, a concentration adjusting tank is provided in the circulation path 146, and concentration is adjusted to an optimal concentration by adding a solvent to the circulated liquid LM, in the concentration adjusting tank.

The inflow path 140 according to the embodiment includes a predetermined flow path resistance Ri. In contrast to this, the outflow path 143 according to the embodiment includes a variable flow path resistance Ro. The liquid ejecting apparatus 100 according to the embodiment is provided with the changing mechanism 147 for changing the flow path resistance Ro of the outflow path 143. According to the embodiment, the changing mechanism 147 is provided with a flexible diaphragm 148 which configures a part of a tube wall of the outflow path 143, and a piezoelectric element 149 which can press the diaphragm 148 toward the inside of the outflow path 143. Driving of the piezoelectric element 149 is controlled by the control unit 101. When the piezoelectric element 149 is extended, the diaphragm 148 is pressed toward the inside of the outflow path 143, and a flow path sectional area of a part of the outflow path 143 becomes small. Then, the flow path resistance Ro of the outflow path 143 becomes large. On the other hand, when the piezoelectric element 149 contracts, the flow path sectional area of a part of the outflow path 143 becomes large, and the flow path resistance Ro of the outflow path 143 becomes small. In a state in which at least the moving object 120 reciprocates, that is, when at least the liquid ejecting apparatus 100 is in the ejecting state, the flow path resistance Ro of the outflow path 143 becomes larger than the flow path resistance Ri of the inflow path 140.

Figure 3:
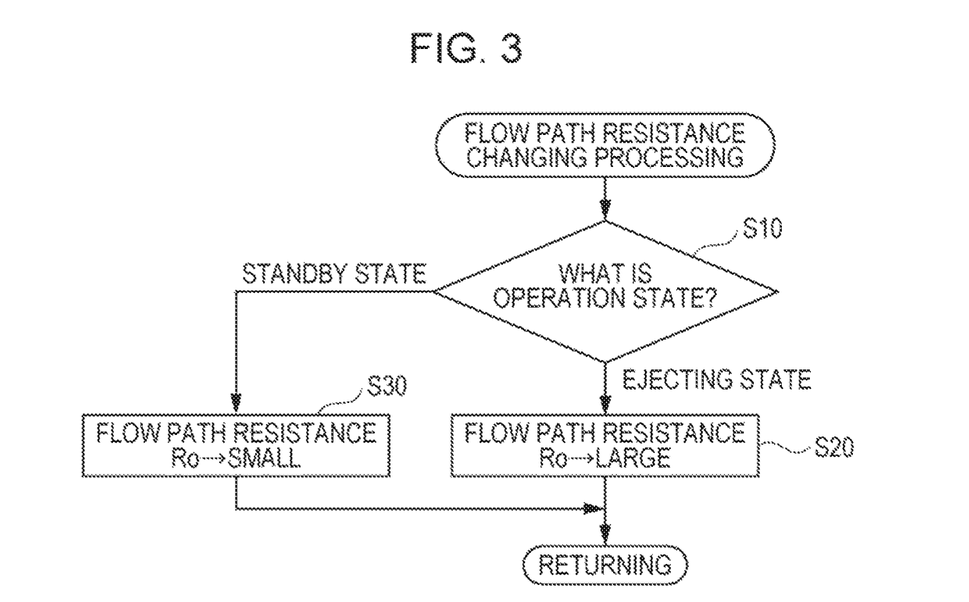
FIG. 3 is a flowchart of flow path resistance changing processing.

FIG. 3 is a flowchart of the flow path resistance changing processing which is executed by the liquid ejecting apparatus 100. The flow path resistance changing processing is processing which is normally executed by the control unit 101 based on the control program stored in the memory, in the middle of the operation of the liquid ejecting apparatus 100, as a method of controlling the liquid ejecting apparatus 100. The flow path resistance changing processing is executed in parallel to processing for manufacturing a shaped object. The processing for manufacturing the shaped object is, for example, processing for controlling a timing for ejecting liquid LM from the nozzle 115, or processing for moving the shaping stage 150.

When the flow path resistance changing processing is executed, the control unit 101 determines whether the operation state of the liquid ejecting apparatus 100 is the ejecting state or the standby state (step S10). When the operation state of the liquid ejecting apparatus 100 is the ejecting state, the control unit 101 controls the changing mechanism 147, and sets the flow path resistance Ro of the outflow path 143 to be larger than the flow path resistance Ri of the inflow path 140 (step S20). When the flow path resistance Ro of the outflow path 143 is set to be larger than the flow path resistance Ri of the inflow path 140, liquid LM hardly flows to the outflow path 143 from the liquid chamber 112. Meanwhile, when the operation state of the liquid ejecting apparatus 100 is the standby state, the control unit 101 controls the changing mechanism 147, and sets the flow path resistance Ro of the outflow path 143 to be smaller than the flow path resistance Ro of the outflow path 143 in the ejecting state (step S30).

According to the above described liquid ejecting apparatus 100 in the embodiment, since the flow path resistance Ro of the outflow path 143 is set to be larger than the flow path resistance Ri of the inflow path 140 in the ejecting state, it is possible to increase a pressure in the liquid chamber 112 in the ejecting state. For this reason, it is possible to rapidly perform supplement of liquid LM from the liquid chamber 112 to the nozzle 115, while suppressing sinking or accumulating of a sinking component (powder component) in the liquid LM, and to cause liquid LM to be ejected in a short cycle. As a result, it is possible to make a manufacturing time of a shaped object short, or improve a manufacturing accuracy (shaping resolution) of the shaped object. In addition, the short cycle is, for example, 1 kHz or more in a case in which viscosity of liquid LM is 100 mPa·s, and is 100 Hz or more in a case in which viscosity of the liquid LM is 1000 mPa·s or more.

According to the embodiment, since the flow path resistance Ro of the outflow path 143 in the standby state is set to be smaller than the flow path resistance Ro of the outflow path 143 in the ejecting state, it is possible to make liquid LM easily flow to the outflow path 143 from the liquid chamber 112 in the standby state. For this reason, in the standby state, it is possible to further efficiently suppress sinking or accumulating of the sinking component in the liquid LM, in the vicinity of the nozzle 115 in the liquid chamber 112. In addition, according to the embodiment, the flow path resistance Ro of the outflow path 143 in the standby state is set to be smaller than the flow path resistance Ro of the outflow path 143 in the ejecting state; however, the flow path resistance Ro of the outflow path 143 in the standby state may be set to the flow path resistance Ri or less of the inflow path 140.

According to the embodiment, since the control unit 101 changes the flow path resistance Ro of the outflow path 143 using the changing mechanism 147, it is possible to dynamically change the flow path resistance Ro of the outflow path 143 as described above. Accordingly, it is possible to preferably control a flowing state of liquid LM according to the operation state of the liquid ejecting apparatus 100.

According to the embodiment, since the flow path resistance Ro is changed by changing a flow path sectional area of a part of the outflow path 143 using the changing mechanism 147, it is possible to easily change the flow path resistance Ro.

According to the embodiment, since the liquid ejecting apparatus 100 is provided with the circulation path 146, and it is possible to reuse the liquid LM which is flown out from the outflow path 143, it is possible to efficiently use the liquid LM.

B. Second Embodiment

Figure 4:
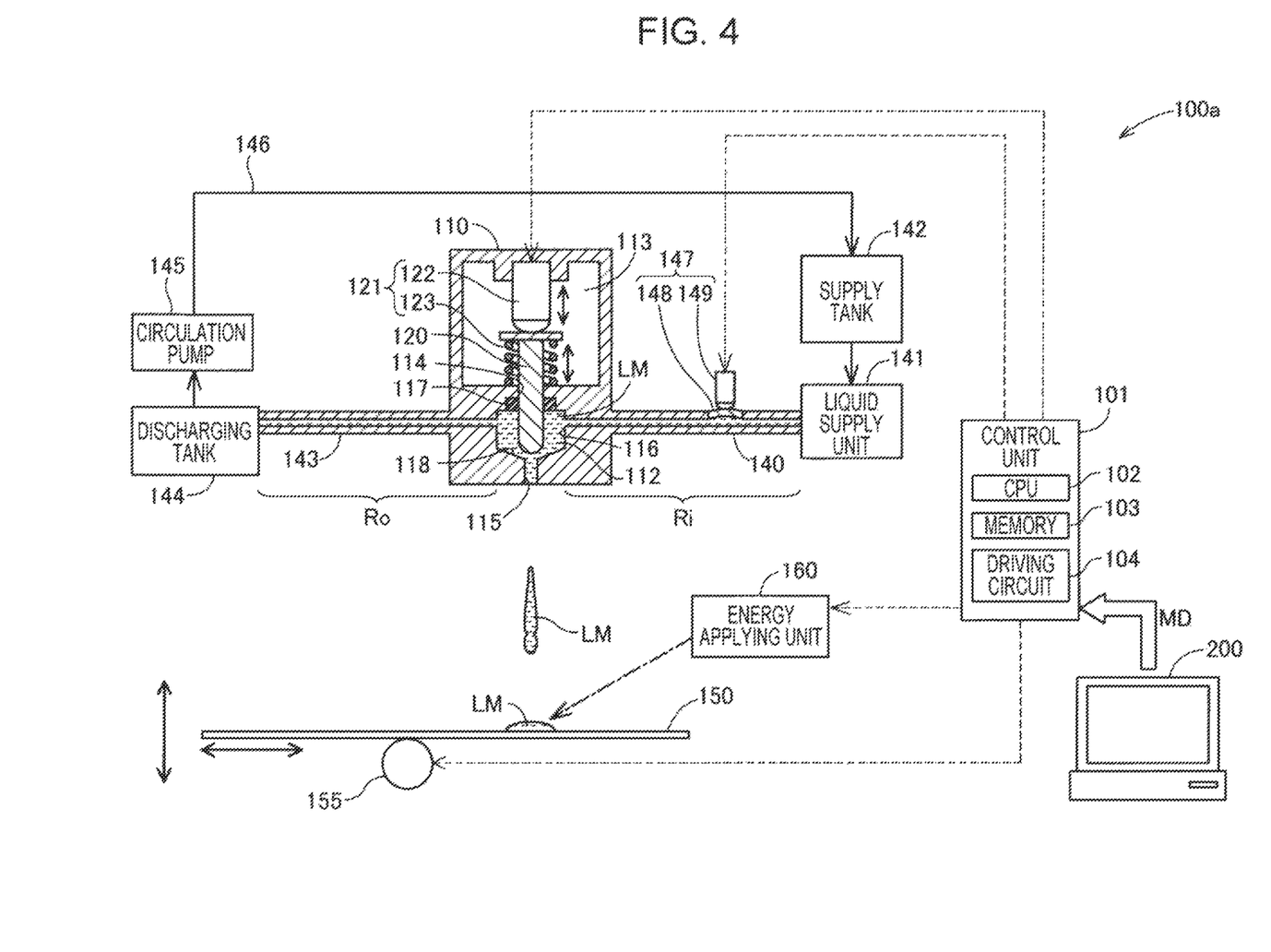
FIG. 4 is an explanatory diagram which illustrates a schematic configuration of a liquid ejecting apparatus according to a second embodiment.

FIG. 4 is an explanatory diagram which illustrates a schematic configuration of a liquid ejecting apparatus 100a according to a second embodiment. The liquid ejecting apparatus 100 according to the first embodiment is provided with the changing mechanism 147 which can change a flow path resistance of the outflow path 143. In contrast to this, the liquid ejecting apparatus 100a according to the second embodiment is provided with a changing mechanism 147 which can change a flow path resistance of the inflow path 140. According to the embodiment, it is possible to set the flow path resistance Ri of the inflow path 140 to be smaller than the flow path resistance Ro of the outflow path 143, by changing a flow path sectional area of a part of the inflow path 140 using the changing mechanism 147 which is provided in the inflow path 140. By adopting such a configuration, it is possible to set the flow path resistance Ro of the outflow path 143 to be larger than the flow path resistance Ri of the inflow path 140 at least in the ejecting state, similarly to the first embodiment.

C. Third Embodiment

Figure 5:
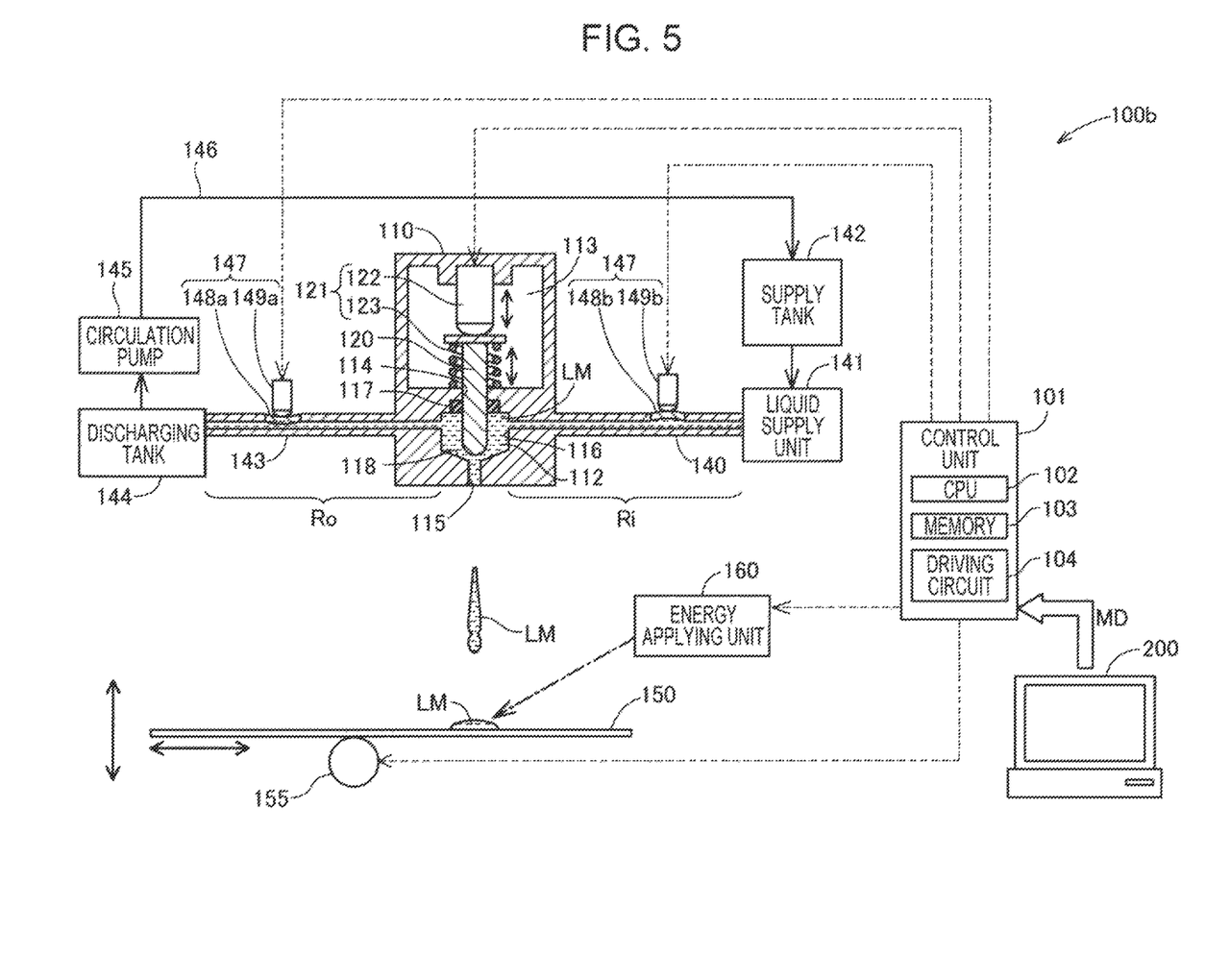
FIG. 5 is an explanatory diagram which illustrates a schematic configuration of a liquid ejecting apparatus according to a third embodiment.

FIG. 5 is an explanatory diagram which illustrates a schematic configuration of a liquid ejecting apparatus 100*b* according to a third embodiment. The liquid ejecting apparatus 100 according to the first embodiment is provided with the changing mechanism 147 which can change a flow path resistance of the outflow path 143. In addition, the liquid ejecting apparatus 100*a* according to the second embodiment is provided with the changing mechanism 147 which can change a flow path resistance of the inflow path 140. In contrast to this, the liquid ejecting apparatus 100*b* in the embodiment is provided with a changing mechanism 147 which can change both of the outflow path 143 and the inflow path 140. More specifically, the changing mechanism 147 in the embodiment is provided with a diaphragm 148*a* and a piezoelectric element 149*a* for changing the flow path resistance Ro of the outflow path 143, and a diaphragm 148*b* and a piezoelectric element 149*b* for changing the flow path resistance Ri of the inflow path 140. That is, the changing mechanism 147 in the embodiment includes a changing mechanism provided on the outflow path 143 side, and a changing mechanism provided on the inflow path 140 side. By adopting such a configuration, it is possible to set the flow path resistance Ro of the outflow path 143 to be larger than the flow path resistance Ri of the inflow path 140 in at least the ejecting state, by changing both of the flow path resistance Ro of the outflow path 143 and the flow path resistance Ri of the inflow path 140.

D. Fourth Embodiment

In the above described first to third embodiments, the flow path resistance is changed by changing the flow path sectional area of a part of the outflow path 143 or the inflow path 140. In contrast to this, the flow path resistance of the outflow path 143 or the inflow path 140 may be changed, by changing the flow path sectional area of the entire outflow path 143 or the entire inflow path 140. In order to change the flow path sectional area of the entire flow path, for example, it is possible to change the flow path sectional area when the control unit 101 selects a flow path through which liquid LM is caused to flow from a plurality of flow paths using a switching valve, or the like, by preparing the plurality of flow paths of which a thickness (flow path sectional area) is different, for example.

E. Fifth Embodiment

According to the first to third embodiments, the flow path resistances are changed, by changing the flow path sectional area of a part of the outflow path 143 or the inflow path 140. In contrast to this, a flow path resistance may be changed by changing a length of the outflow path 143 or the inflow path 140. When the length of the outflow path 143 or the inflow path 140 is set to be long, a flow path resistance becomes large that much. In order to change a length of the flow path (outflow path 143 or inflow path 140), for example, the flow path may be configured, using an extendable tube. In addition to that, the length of the flow path may be changed when the control unit 101 selects a flow path through which liquid LM is caused to flow from the plurality of flow paths using a switching valve, or the like, by preparing a plurality of flow paths of which lengths are different. In addition to that, for example, the flow path resistance may be changed when the control unit 101 selects a flow path through which liquid LM is caused to flow from a plurality of flow paths using a switching valve, or the like, by preparing the plurality of flow paths of which frictional coefficients of tube are different.

F. Sixth Embodiment

In the above described embodiments, the changing mechanism 147 is configured of the diaphragm 148 and the piezoelectric element 149. In contrast to this, the changing mechanism 147 may be any mechanism when the changing mechanism can change the flow path resistance of the outflow path 143 of the inflow path 140. For example, the flow path resistance of the outflow path 143 of the inflow path 140 may be changed by changing the flow path sectional area using a share mode type piezoelectric element. In addition, for example, the flow path resistance of the outflow path 143 of the inflow path 140 may be changed when a protrusion portion which protrudes to the inside of the flow path through a through-hole formed in a tube wall in the outflow path 143 or the inflow path 140 is provided, and the control unit 101 controls a protruding state of the protrusion portion.

G. Seventh Embodiment

In the above described embodiments, the ejecting unit 110 is provided with the piezoelectric element 122 as the actuator 121 which causes the moving object 120 to reciprocate. In contrast to this, the ejecting unit 110 may be provided with any actuator when it is an actuator which can cause the moving object 120 to reciprocate. For example, it may be an actuator which causes the moving object 120 to reciprocate using compressed air, a solenoid, a motor or the like.

H. Eighth Embodiment

Figure 6:
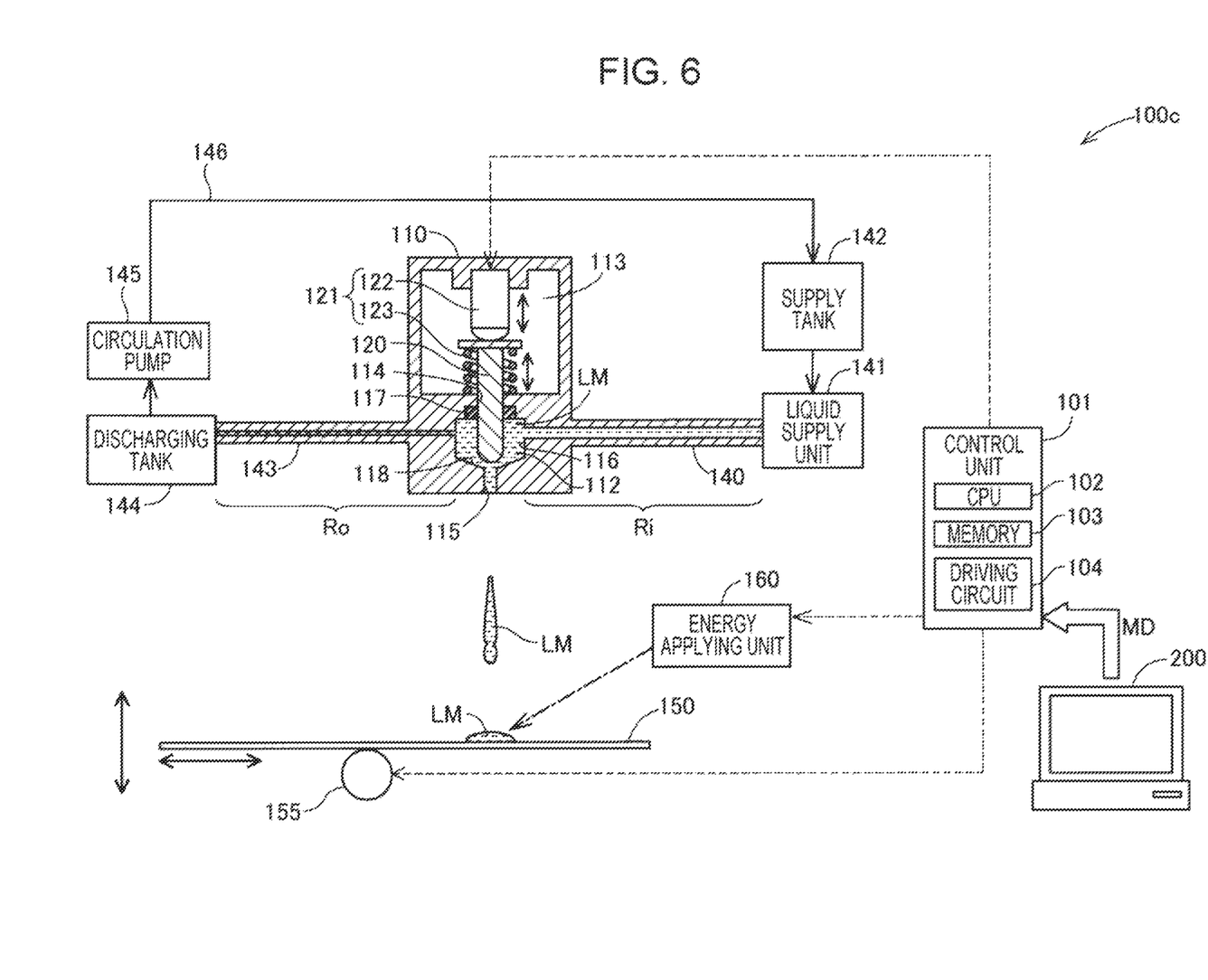
FIG. 6 is an explanatory diagram which illustrates a schematic configuration of a liquid ejecting apparatus according to an eighth embodiment.

FIG. 6 is an explanatory diagram which illustrates a schematic configuration of a liquid ejecting apparatus 100*c* according to an eighth embodiment. In the above described each embodiment, the flow path resistance Ro of the outflow path 143 is set to be larger than the flow path resistance Ri of the inflow path 140 in at least the ejecting state, by changing at least one flow path resistance of the outflow path 143 and the inflow path 140, using the changing mechanism 147. In contrast to this, the liquid ejecting apparatus 100*c* in the eighth embodiment is not provided with the changing mechanism 147. In addition, the outflow path 143 is formed in advance so as to have the flow path resistance Ro which is larger than the flow path resistance Ri of the inflow path 140. That is, in the embodiment, the flow path resistance Ro of the outflow path 143 is usually larger than the flow path resistance Ri of the inflow path 140, regardless of the operation state of the liquid ejecting apparatus 100. By adopting such a configuration, the flow path resistance Ro of the outflow path 143 becomes larger than the flow path resistance Ri of the inflow path 140 in at least the ejecting state. In addition, according to the embodiment, the control unit 101 is not provided with a function for controlling the changing mechanism 147.

The invention is not limited to the above described embodiments, and can be executed in various configurations without departing from the scope of the invention. For example, technical characteristics in the embodiment corresponding to technical characteristics in each embodiment which are described in summary can be appropriately replaced or combined in order to solve a part or all of the above described problems, or to achieve a part or all of the above described effects. In addition, when the technical characteristics are not described as essential characteristics in the specification, those can be appropriately omitted.

The entire disclosure of Japanese Patent Application No. 2016-254630, filed Dec. 28, 2016 is expressly incorporated by reference herein.

What is claimed is:

1. A liquid ejecting apparatus comprising:
   a liquid chamber which communicates with a nozzle for ejecting liquid;
   an inflow path which is connected to the liquid chamber;
   a liquid supply unit which supplies the liquid to the inflow path;
   an outflow path which is connected to the liquid chamber, and through which the liquid is caused to flow out from the liquid chamber;
   a moving object which causes the liquid to be ejected from the nozzle by reciprocating toward the nozzle in the liquid chamber; and
   an actuator which causes the moving object to reciprocate,
   wherein, at least in an ejecting state in which the liquid is continuously ejected from the nozzle due to reciprocating of the moving object, a flow path resistance of the outflow path is larger than that of the inflow path.

2. The liquid ejecting apparatus according to claim 1, further comprising:
   a changing mechanism which can change a flow path resistance of at least one of the inflow path and the outflow path; and
   a control unit which sets the flow path resistance of the outflow path in the ejecting state to be larger than that of the inflow path, by controlling the changing mechanism.

3. The liquid ejecting apparatus according to claim 2, wherein the control unit sets the flow path resistance of the outflow path in a standby state in which the moving object stands by in a state in which the nozzle is closed to be smaller than that of the outflow path in the ejecting state, by controlling the changing mechanism.

4. The liquid ejecting apparatus according to claim 2, wherein the changing mechanism changes the flow path resistance by changing at least a part of flow path sectional area of at least one of the inflow path and the outflow path.

5. The liquid ejecting apparatus according to claim 1, further comprising:
   a circulation path through which the liquid which flows out to the outflow path is resupplied to the liquid supply unit.

6. A method of controlling a liquid ejecting apparatus which includes a liquid chamber which communicates with a nozzle for ejecting liquid, an inflow path which is connected to the liquid chamber, a liquid supply unit which supplies the liquid to the inflow path, an outflow path which is connected to the liquid chamber, and through which the liquid is caused to flow out from the liquid chamber, a moving object which causes the liquid to be ejected from the nozzle by reciprocating toward the nozzle in the liquid chamber, an actuator which causes the moving object to reciprocate, and a changing mechanism which can change a flow path resistance of at least one of the inflow path and the outflow path, the method comprising:
   setting the flow path resistance of the outflow path in an ejecting state in which the liquid is continuously ejected from the nozzle due to reciprocating of the moving object to be larger than that of the inflow path, by controlling the changing mechanism.

7. A computer program for controlling a liquid ejecting apparatus which includes a liquid chamber which communicates with a nozzle for ejecting liquid, an inflow path which is connected to the liquid chamber, a liquid supply unit which supplies the liquid to the inflow path, an outflow path which is connected to the liquid chamber, and through which the liquid is caused to flow out from the liquid chamber, a moving object which causes the liquid to be ejected from the nozzle by reciprocating toward the nozzle in the liquid chamber, an actuator which causes the moving object to reciprocate, a moving object which causes the liquid to be ejected from the nozzle by reciprocating toward the nozzle in the liquid chamber, an actuator which causes the moving object to reciprocate, and a changing mechanism which can change a flow path resistance of at least one of the inflow path and the outflow path, the computer program causing a computer to execute a function of:
   setting the flow path resistance of the outflow path in an ejecting state in which the liquid is continuously ejected from the nozzle due to reciprocating of the moving object to be larger than that of the inflow path, by controlling the changing mechanism.

* * * * *